(12) United States Patent
Kyuno et al.

(10) Patent No.: US 6,235,800 B1
(45) Date of Patent: May 22, 2001

(54) HEAT-EXPANDABLE MICROCAPSULES AND METHOD OF UTILIZING THE SAME

(75) Inventors: Seiji Kyuno; Toshiaki Masuda, both of Osaka (JP)

(73) Assignee: Matsumoto Yushi-Seiyaku Co., Ltd., Yao (JP)

( * ) Notice: Subject to any disclaimer, the term of this patent is extended or adjusted under 35 U.S.C. 154(b) by 0 days.

(21) Appl. No.: 09/646,050

(22) PCT Filed: Mar. 10, 1999

(86) PCT No.: PCT/JP99/01156

§ 371 Date: Sep. 13, 2000

§ 102(e) Date: Sep. 13, 2000

(87) PCT Pub. No.: WO99/46320

PCT Pub. Date: Sep. 16, 1999

(30) Foreign Application Priority Data

Mar. 13, 1998 (JP) .................................................. 10-082942

(51) Int. Cl.[7] .............................. C08J 9/32; C08J 9/224; B01J 13/02

(52) U.S. Cl. ................................ 521/51; 521/54; 521/56; 521/60

(58) Field of Search ................................ 521/54, 60, 56, 521/57

(56) References Cited

U.S. PATENT DOCUMENTS

| | | | |
|---|---|---|---|
| 4,287,308 | 9/1981 | Nakayama et al. | 521/53 |
| 4,582,756 | 4/1986 | Niinuma et al. | 428/327 |
| 5,536,756 | 7/1996 | Kida et al. | 521/56 |
| 5,726,222 | 3/1998 | Sawaoka et al. | 523/211 |

FOREIGN PATENT DOCUMENTS

| | | |
|---|---|---|
| 42-26524 | 12/1967 | (JP) . |
| 56-113338 | 9/1981 | (JP) . |
| 56-143229 | 12/1981 | (JP) . |
| 62-286534 | 12/1987 | (JP) . |
| 1-104634 | 4/1989 | (JP) . |
| 4-246640 | 9/1992 | (JP) . |
| 5-15499 | 3/1993 | (JP) . |
| 6-49260 | 2/1994 | (JP) . |

Primary Examiner—Morton Foelak
(74) Attorney, Agent, or Firm—Foley & Lardner

(57) ABSTRACT

The present invention relates to a heat-expandable microcapsule produced from acrylonitrile and N-substituted maleimide as the main polymerizable monomers, or further a monomer giving a hompolymer having a Tg of 50 to 200° C. and polymerizable unsaturated carboxylic acid (including anhydrides), resin foam using this, and a process for producing a foamed resin composite. The present invention can provide a heat-expandable microcapsule that is less apt to color even upon thermal expansion at 200° C. or higher, and a resin foam and a foamed resin composite capable of forming a processed surface, e.g., a matte surface giving a bulky feeling, by using this microcapsule.

10 Claims, No Drawings

HEAT-EXPANDABLE MICROCAPSULES AND METHOD OF UTILIZING THE SAME

TECHNICAL FIELD

The present invention relates to thermo-expandable microcapsules having superior thermo-resistance and the application thereof.

TECHNICAL BACKGROUND

The production process of thermo-expandable microcapsules wherein thermoplastic polymer encapsulates a volatile expansion agent which gasifies at a temperature lower than the softening point of the polymer has already been disclosed, for example, in Japanese Patent Publication Sho 42-26524.

Japanese Patent Laid-Open Sho 60-19033 (equivalent to U.S. Pat. No. 4,582,756) discloses a process wherein the surface of micro-balloons is covered with thermosetting resin to produce solvent-resistant micro-balloons that can be added into hot molten resin.

Japanese Patent Publication Hei 5-15499 and Japanese Patent Laid-Open Hei 5-285376 (equivalent to U.S. Pat. No. 5,536,756) disclose a process wherein a monomer mixture comprising 80 percent or more of nitrile monomer having polymerizable unsaturated bonds form the shell of microcapsules that have superior heat and solvent resistance.

The microcapsules produced in the processes are blended in synthetic resins to impart matte and bulky effect to construction materials (materials for ceiling, wall, floor and the like) or coating materials for bags.

Japanese Patent Laid-Open Hei 7-304968 (equivalent to U.S. Pat. No. 5,726,222) discloses the microcapsules comprising a shell of which main component is (B) a thermoplastic resin soluble in a thermosetting resin under heating and (A) a curing agent of the thermosetting resin being encapsulated in the shell. It discloses that the microcapsules contribute to the production of a thermosetting resin composition or prepreg stable under storage at normal temperature and fiber-reinforced composite having uniform hardness and superior mechanical property. And polyether imide and polyimide are exemplified as the thermoplastic resin, (B), and maleimide resin is exemplified as the thermosetting resin.

Microcapsules need to be heated for expansion and their color changes depending on the heating temperature, remarkably at 200° C. or more. None of the thermo-expandable microcapsules developed in the past as mentioned above was durable against the color change under heating at 200° C. or more and retained matte effect.

The object of the present invention is to provide thermo-expandable microcapsules which can be used to produce synthetic resin foam layer having matte and bulky surface and durable against thermal coloration especially under heating at 200° C. or more and to provide resin foam and foamed resin composite produced with the same to solve the above problem.

DISCLOSURE OF INVENTION

The present invention provides the products and processes described from (1) to (6) as follows.

(1) A thermo-expandable microcapsule comprising: a shell of a polymer of which main polymerizable monomer components are a nitrile monomer and N-substituted maleimide; and a volatile expanding agent having a boiling point lower than the softening point of the shell polymer, the volatile expanding agent being encapsulated in the shell.

(2) A thermo-expandable microcapsule comprising: a shell of a polymer of which main polymerizable monomer components are a nitrile monomer and N-substituted maleimide and another component is a monomer forming a homopolymer having a Tg of 50–200° C.; and a volatile expanding agent having a boiling point lower than the softening point of the shell polymer, the volatile expanding agent being encapsulated in the shell.

(3) A thermo-expandable microcapsule comprising: a shell of a polymer of which main polymerizable monomer components are a nitrile monomer and N-substituted maleimide and other components are a monomer forming a homopolymer having a Tg of 50–200° C. and polymerizable unsaturated carboxylic acid (including anhydrides); and a volatile expanding agent having a boiling point lower than the softening point of the shell polymer, the volatile expanding agent being encapsulated in the shell.

(4) A thermo-expandable microcapsule described in the above (1) wherein the nitrile monomer contains at least acrylonitrile.

(5) A production process of foamed resin composite produced by coating a base material with a mixture of resin and one of the thermo-expandable microcapsules described in the above (1) to (3) and by heating to form a foamed resin layer.

(6) A production process of resin foam produced by mixing one of the thermo-expandable microcapsules described in the above (1) to (3) and resin and by heating the mixture to form into resin foam.

BEST MODE OF EMBODIMENT OF INVENTION

The best mode of the embodiment of the present invention is described as follows.

The shell of the thermo-expandable microcapsules of the present invention comprises a polymer of which main polymerizable monomer components are nitrile monomer and N-substituted maleimide and another polymerizable monomer component is a monomer forming a homopolymer having 50–200° C. Tg and encapsulates a volatile expanding agent having a boiling point lower than the softening point of the shell polymer.

The preferable polymer for the shell comprises acrylonitrile and N-maleimide as the main polymerizable monomers, a monomer forming a homopolymer having 50–200° C. Tg and polymerizable unsaturated carboxylic acids (including anhydrides).

The production process of the foamed resin composite of the present invention comprises the step wherein a base material is coated with the mixture of the thermo-expandable microcapsules and resin and heated to be formed into foamed resin layer.

The production process of the foam of the present invention comprises the step wherein the thermo-expandable microcapsules and resin are mixed and heated to be formed into resin foam.

The N-substituted maleimide used for the present invention includes N-phenyl maleimide, N-naphthyl maleimide, N-cycroheyxl maleimide and methyl maleimide, and one or more of halogen atoms can substitute the allyls and alkyls in their molecules. Among those malemimdes, N-phenyl maleimide and N-cyclohexyl maleimide are preferable for their availability.

The ratio of N-substituted maleimide used as the polymerizable monomer for the present invention is 5 to 50 weight percent, preferably 10 to 30 weight percent. The ratio less than 5 weight percent is not effective to prevent the thermal coloring of microcapsules and the ratio more than 50 weight percent fails to produce thermo-expandable microcapsules having sufficient expanding performance.

The polymerizable nitrile monomers used for the present invention are acrylonitrile, methacrylonitrile and dicyanonitrile. Among those, acrylonitrile, being blended by 40 to 85 weight percent of the shell polymer, is preferable for attaining high heat resistance and vapor-barrier performance.

The ratio of nitrile monomer in the polymerizable monomers for forming the shell is 55 to 85 weight percent. The ratio less than 55 weight percent causes low vapor-barrier performance, while the ratio more than 85 weight percent results in poor expansion of microcapsules.

The polymerizable monomer used for the present invention other than acrylonitrile and N-substituted maleimide is selected among the monomers of which homopolymer has a Tg of 50 to 200° C. The examples of such monomers are acrylate, methacrylate and styrene.

The ratio of those monomers is usually 25 weight percent or less, preferably 5 to 25 weight percent. The ratio higher than 25 weight percent reduces gas-barrier performance or expansion performance of microcapsules.

The polymerizable unsaturated carboxylic acids (including anhydrides) used for the present invention include acrylic acid, methacrylic acid, crotonic acid, maleic acid and maleic anhydride. And methacrylic acid, crotonic acid and maleic anhydride are preferable for attaining high foaming performance.

The ratio of those carboxylic acids is usually 5 weight percent or less, preferably 0.1 to 3 weight percent. The ratio more than 5 weight percent reduces the expansion performance of microcapsules.

The volatile expansion agent having a boiling point lower than the softening point of the shell polymer are the low-boiling-point expansion agents such as, normal butane, isobutene, isopentane, neopentane, normal pentane, hexane, isohexane, neohexane, heptane, isoheptane, octane, isooctane, petroleum ether, petroleum benzine, halides of methane and tetra alkyl silane.

The production of microcapsules with the above materials is performed following ordinary processes for producing such products, not being restricted within the scope mentioned above. The preferable process is disclosed in, for example, Japanese Patent Publication Sho 42-26524 wherein polymerizable monomers are mixed with a volatile expanding agent and a polymerization initiator and the mixture is suspended and polymerized in an aqueous medium which may contain an emulsifier or dispersant depending on necessity.

The preferable polymerization initiators are diisopropyl oxydicarbonate, lauroyl peroxide, benzoyl peroxide, azobisdimethyl valeronitrile and azobisisobutyl nitrile.

The oil phase can optionally contain cross-linking agents, such as triethylene glycol diacrylate, ethylene glycol diacrylate, trimethylol propane triacrylate, ethylene glycol methacrylate, divinyl benzene, triacryl formal and vinyl methacrylate.

The aqueous medium in which monomers are suspended and polymerized is usually prepared by blending inorganic additives, for example, silica, calcium phosphate and sodium chloride; and organic additives, for example, diethanolamine-adipic acid condensate, gelatin, methyl cellulose, polyvinyl alcohol, polyethylene oxide, dioctyl sulfosuccinate and sorbitane ester in deionized water and by controlling the pH of the mixture into 3 to 4 with acids, though the formula of the water phase is not restricted within the scope described here.

The preferable resins for forming the foamed resin layer with the above thermo-expandable microcapsules to produce foamed resin composite of the present invention are ethylene vinyl acetate emulsion and vinyl chloride prastizol. In addition, known synthetic resins used for paints, inks, adhesives, leathery sheets and coating materials are also selected according to needs.

The resins to be blended with the above thermo-expandable microcapsules and heated and formed into the resin foam of the present invention are vinyl chloride resin, urethane resin, synthetic rubber and styrene resin. In addition, known synthetic resins used for sole, rubber foam and fiber-reinforced composite are also selected.

EXAMPLES

The present invention is explained more in detail with the following examples and comparative examples.

Comparative Example 1

An oily mixture and an aqueous mixture of the following formulae were prepared.

| Oily mixture | |
| --- | --- |
| Acrylonitrile | 170 parts by weight |
| Methyl methacrylate | 130 parts by weight |
| Normal pentane | 60 parts by weight |
| Divinyl benzene | 1 part by weight |
| Azobisisobutyronitrile | 1 part by weight |
| Aqueous mixture (pH: 4) | |
| Ion-exchanged water | 600 parts by weight |
| Colloidal silica dispersion (20-percent solid) | 100 parts by weight |
| Diethanolamine-adipic acid condensate (50-percent aqueous solution) | 5 parts by weight |
| Sodium chloride | 150 parts by weight |

The above oily mixture and aqueous mixture are mixed and dispersed in a homogenizer at 6000 rpm for 120 seconds. Then the mixture was transferred into a 1.5-liter autoclave in which the air was replaced by nitrogen gas and polymerized under the pressure of 0.3–0.4 MPa at 70° C. for 20 hours to produce microcapsules having 20.2 μm average particle diameter.

An ethylene vinyl acetate emulsion and the produced microcapsules were mixed in 4:1 ratio based on the volume of solid matter and applied on a sheet of paper sample to make up a dry coating of 80 μm thickness.

The sheet was then heated in an oven at 200° C. for 1 minute to make foamed synthetic resin layer. The foamed synthetic resin layer expanded into 3 times of its original thickness.

The thermal yellowing of the foamed synthetic resin layer was checked by determining its color coordinate b of Hunter system of color and the matting effect of the layer was checked by determining its 60° specular gloss. The result is shown in Table 1.

The foamed synthetic resin layer produced with the microcapsules exhibited slight yellowing though it has almost no matting effect.

The preferable values found in the above testing are 5 times or more of expansion ratio, 6.0 or less of color coordinate b and 6.0 or less of 60° specular gloss.

Comparative Example 2

An oily mixture was prepared with the following formula.

| Oily mixture | |
| --- | --- |
| Acrylonitrile | 150 parts by weight |
| Methacrylonitrile | 100 parts by weight |
| Ethyl acrylate | 50 parts by weight |
| Normal pentane | 60 parts by weight |
| Divinyl benzene | 1 part by weight |
| Azobisisobutyronitrile | 1 part by weight |

The above oily mixture and the aqueous mixture in Comparative example 1 were mixed and processed in the same manner as in Comparative example 1 to produce microcapsules having 22.1 μm average particle diameter.

The resultant microcapsules were evaluated in the same manner as in Comparative example 1 and the result is shown in Table 1.

The foamed synthetic resin layer produced with the microcapsules exhibited high thermal yellowing and poor matting effect.

Comparative Example 3

An oily mixture was prepared with the following formula.

| Oily mixture | |
| --- | --- |
| Acrylonitrile | 150 parts by weight |
| Methacrylonitrile | 100 parts by weight |
| Isobornyl methacrylate | 50 parts by weight |
| Normal pentane | 60 parts by weight |
| Divinyl benzene | 1 part by weight |
| Azobisisobutyronitrile | 1 part by weight |

The above oily mixture and the aqueous mixture in Comparative example 1 were mixed and processed in the same manner as in Comparative example 1 to produce microcapsules having 20.4 μm average particle diameter.

The resultant microcapsules were evaluated in the same manner as in Comparative example 1 and the result is shown in Table 1.

The foamed synthetic resin layer produced with the microcapsules exhibited sufficient matting effect while showing high thermal yellowing.

Example 1

An oily mixture was prepared with the following formula.

| Oily mixture | |
| --- | --- |
| Acrylonitrile | 200 parts by weight |
| Methyl methacrylate | 75 parts by weight |
| N-phenyl maleimide | 24 parts by weight |
| Normal pentane | 60 parts by weight |
| Methacrylic acid | 1 part by weight |
| Azobisisobutyronitrile | 1 part by weight |

The above oily mixture and the aqueous mixture in Comparative example 1 were mixed and processed in the same manner as in Comparative example 1 to produce microcapsules having 19.8 μm average particle diameter.

The resultant microcapsules were evaluated in the same manner as in Comparative example 1 and the result is shown in Table 1.

The foamed synthetic resin layer produced with the microcapsules exhibited slight thermal yellowing and sufficient matting effect.

Example 2

An oily mixture was prepared with the following formula.

| Oily mixture | |
| --- | --- |
| Acrylonitrile | 200 parts by weight |
| Methyl methacrylate | 75 parts by weight |
| Cyclohexyl maleimide | 24 parts by weight |
| Normal pentane | 60 parts by weight |
| Methacrylic acid | 1 part by weight |
| Azobisisobutyronitrile | 1 part by weight |

The above oily mixture and the aqueous mixture in Comparative example 1 were mixed and processed in the same manner as in Comparative example 1 to produce microcapsules having 21.5 μm average particle diameter.

The resultant microcapsules were evaluated in the same manner as in Comparative example 1 and the result is shown in Table 1.

The foamed synthetic resin layer produced with the microcapsules exhibited almost no thermal yellowing and sufficient matting effect.

Example 3

An oily mixture was prepared with the following formula.

| Oily mixture | |
| --- | --- |
| Acrylonitrile | 200 parts by weight |
| Dicyclopentenyl acrylate | 75 parts by weight |
| Dicyclohexyl maleimide | 24 parts by weight |
| Normal pentane | 60 parts by weight |
| Crotonic acid | 1 part by weight |
| Azobisisobutyronitrile | 1 part by weight |

The above oily mixture and the aqueous mixture in Comparative example 1 were mixed and processed in the same manner as in Comparative example 1 to produce microcapsules having 22.0 μm average particle diameter.

The resultant microcapsules were evaluated in the same manner as in Comparative example 1 and the result is shown in Table 1.

The foamed synthetic resin layer produced with the microcapsules exhibited almost no thermal yellowing and sufficient matting effect.

Example 4

An oily mixture was prepared with the following formula.

| Acrylonitrile | 200 parts by weight |
| --- | --- |
| Methacrylonitrile | 75 parts by weight |

-continued

| | |
|---|---|
| Cyclohexyl maleimide | 24 parts by weight |
| Normal pentane | 60 parts by weight |
| Crotonic acid | 1 part by weight |
| Azobisisobutyronitrile | 1 part by weight |

The above oily mixture and the aqueous mixture in Comparative example 1 were mixed and processed in the same manner as in Comparative example 1 to produce microcapsules having 23 μm average particle diameter.

The resultant microcapsules were evaluated in the same manner as in Comparative example 1 and the result is shown in Table 1.

The foamed synthetic resin layer produced with the microcapsules exhibited almost no thermal yellowing and sufficient matting effect.

Example 5

Microcapsules were produced in the same manner as in Example 3 except 1 part by weight of crotonic acid was not used in the oily mixture of Example 3 and microcapsules having 22 μm average particle diameter were obtained.

The foamed synthetic resin layer produced with the microcapsules exhibited slight thermal yellowing and sufficient matting effect though the foaming performance was a little inferior to that of Example 3.

Example 6

Microcapsules were produced in the same manner as in Example 3 except 75 parts by weight of dicyclopentenyl acrylate was not used in the oily mixture of Example 3 and microcapsules having 21 μm average particle diameter were obtained.

The microcapsules exhibited a little lower expansion ratio than the microcapsules of Example 3.

Comparative Example 4

An oily mixture was prepared with the following formula.

| Oily mixture | |
|---|---|
| Acrylonitrile | 150 parts by weight |
| Methyl methacrylate | 50 parts by weight |
| Dicyclopentenyl acrylate | 75 parts by weight |
| Dicyclohexyl maleimide | 24 parts by weight |
| Normal pentane | 60 parts by weight |
| Crotonic acid | 1 part by weight |
| Azobisisobutyronitrile | 1 part by weight |

The above oily mixture and the aqueous mixture in Comparative example 1 were mixed and processed in the same manner as in Comparative example 1 to produce microcapsules having 18 μm average particle diameter.

The resultant microcapsules had inferior vapor-barrier performance and heat resistance to those of the microcapsules of Example 3.

TABLE 1

| Tests | Expansion ratio (times) | b values | 60° specular gloss |
|---|---|---|---|
| Comparative example 1 | 3 | 5.2 | 25.9 |
| Comparative example 2 | 5 | 10.8 | 14.9 |
| Comparative example 3 | 8 | 8.5 | 4.9 |
| Example 1 | 8 | 3.2 | 4.9 |
| Example 2 | 7 | 3.9 | 3.9 |
| Example 3 | 9 | 2.9 | 4.7 |
| Example 4 | 7 | 4.3 | 4.4 |
| Example 5 | 6 | 3.1 | 5.1 |
| Example 6 | 5 | 3.2 | 5.5 |
| Comparative example 4 | 3 | 4.7 | 17.4 |

*1: The b values in the table are the color coordinate b in Hunter system of color and were determined with a spectral colorimeter CLR-7100F produced by SHIMADZU Co., Ltd. with standard illuminant C. The testing parameters were 2-degrees visual field, 0-degree illuminating angle and 45-degrees light-detecting angle.

Example 7

Ten parts by weight of the thermo-expandable microcapsules produced in Example 3 and 90 parts by weight of synthetic rubber were kneaded at 150° C. for 20 minutes and formed into a sole.

Uniform pores of the microcapsules were observed at the cross section of the sole. And the sole was light and durable against wear.

Application in Industry

The present invention can provide thermo-expandable microcapsules which are durable against thermal coloring when heated and expanded at 200° C. or more and foamed resin layer or resin foam which are produced with the microcapsules and can form matte and bulky coating.

What is claimed is:

1. A thermo-expandable microcapsule comprising: a shell of a polymer of which main polymerizable monomer components are a nitrile monomer and N-substituted maleimide; and a volatile expanding agent having a boiling point lower than the softening point of said shell polymer, said volatile expanding agent being encapsulated in said shell.

2. A thermo-expandable microcapsule comprising: a shell of a polymer of which main polymerizable monomer components are a nitrile monomer and N-substituted maleimide and another component is a monomer forming a homopolymer having a Tg of 50–200° C.; and a volatile expanding agent having a boiling point lower than the softening point of said shell polymer, said volatile expanding agent being encapsulated in said shell.

3. A thermo-expandable microcapsule comprising: a shell of a polymer of which main polymerizable monomer components are a nitrile monomer and N-substituted maleimide and other components are a monomer forming a homopolymer having a Tg of 50–200° C. and polymerizable unsaturated carboxylic acid (including anhydrides); and a volatile expanding agent having a boiling point lower than the softening point of said shell polymer, said voltile expanding agent being encapsulated in said shell.

4. A thermo-expandable microcapsule of claim 1, wherein the nitrile monomer at least contains acrylonitrile.

5. A production process of foamed resin composite comprising: coating a base material with a mixture of resin and a thermo-expandablemicrocapsule of claim 1, and heating the coat to form a foamed resin layer.

6. A production process of resin foam comprising: mixing a thermo-expandable microcapsule of claim 1 and resin; and heating the mixture to form into resin foam.

7. A production process of foamed resin composite comprising: coating a base material with a mixture of resin and a thermo-expandable microcapsule of claim 2 and heating the coat to form a foamed resin layer.

8. A production process of foamed resin composite comprising: coating a base material with a mixture of resin and a thermo-expandable microcapsule of claim 3 and heating the coat to form a foamed resin layer.

9. A production process of resin foam comprising: mixing a thermo-expandable microcapsule of claim 2 and resin; and heating the mixture to form into resin foam.

10. A production process of resin foam comprising: mixing a thermo-expandable microcapsule of claim 3 and resin; and heating the mixture to form into resin foam.

* * * * *